United States Patent
Yoo et al.

(10) Patent No.: US 6,363,046 B1
(45) Date of Patent: Mar. 26, 2002

(54) OPTICAL RECORDING/PICKUP HEAD COMPATIBLE WITH A DIGITAL VERSATILE DISK (DVD) AND A RECORDABLE COMPACT DISK (CD-R) USING A HOLOGRAPHIC VARIABLE APERTURE

(75) Inventors: Jang-Hoon Yoo; Chul-Woo Lee, both of Seoul (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/049,990

(22) Filed: Mar. 30, 1998

(30) Foreign Application Priority Data

Mar. 28, 1997 (KR) ............................................. 97-11296

(51) Int. Cl.$^7$ ................................................ G11B 7/00
(52) U.S. Cl. .................. 369/112; 369/44.23; 369/94.37; 369/94; 369/103; 369/109; 369/118
(58) Field of Search ............................ 369/94, 54, 112, 369/44.23, 44.37, 118, 103, 109

(56) References Cited

U.S. PATENT DOCUMENTS

| | | | | |
|---|---|---|---|---|
| 5,526,338 A | * | 6/1996 | Hasman et al. | 360/109 |
| 5,659,533 A | * | 8/1997 | Chen et al. | 369/112 |
| 5,703,856 A | * | 12/1997 | Hayashi et al. | 369/54 |
| 5,761,176 A | * | 6/1998 | Takahashi | 369/109 |

FOREIGN PATENT DOCUMENTS

| | | |
|---|---|---|
| JP | 63-113947 | 5/1988 |
| JP | 5-242520 | 9/1993 |
| JP | 6-288691 | 2/1994 |
| JP | 6-259804 | 9/1994 |
| JP | 7-65407 | 3/1995 |
| JP | 7-98431 | 4/1995 |
| JP | 8-55363 | 2/1996 |
| JP | 8-62493 | 3/1996 |
| JP | 8-240718 | 9/1996 |

* cited by examiner

*Primary Examiner*—David Hudspeth
*Assistant Examiner*—Kim-Kwok Chu
(74) *Attorney, Agent, or Firm*—Staas & Halsey LLP

(57) ABSTRACT

An optical recording/pickup head having compatibility with a recordable compact disk (CD-R) and a digital video disk (DVD) transmits a first light beam having a wavelength of 635 nm for a DVD emitted from a first light source and a second light beam having a wavelength of 780 nm for a CD-R emitted from a second light source to an objective lens, using a holographic variable aperture. The holographic variable aperture totally transmits the incident first light beam to the objective lens, and transmits part of the incident second light beam to the objective lens. The objective lens focuses the incident first and second light beams on the information recording surfaces of the CD-R and the DVD. The sizes of the light spots which are focussed on the information recording surfaces of the DVD and the CD-R by the objective lens are approximately 0.9 µm and 1.4 µm, respectively, which appropriate for recording and reproducing the respective disks. The light spots have only a main lobe.

33 Claims, 8 Drawing Sheets

OPTICAL RECORDING/PICKUP HEAD COMPATIBLE WITH A DIGITAL VERSATILE DISK (DVD) AND A RECORDABLE COMPACT DISK (CD-R) USING A HOLOGRAPHIC VARIABLE APERTURE

BACKGROUND OF THE INVENTION

1. Field of the Invention

The present invention relates to an optical recording/pickup head compatible with optical disks using respective light beams of wavelengths different from each other which records and reproduces information, and more particularly, to an optical recording/pickup head compatible with a recordable compact disk (CD-R) and a digital versatile disk (DVD).

In an optical disk apparatus using a recording medium for storing a large quantity of information, a compact disk (CD) and a digital versatile disk (DVD) have been widely used. Recently, a recordable compact disk (CD-R) and a digital versatile disk—random access memory (DVD-RAM) have been known. As is well known, when recording and reproducing information, laser light having a wavelength of 780 nm is used for a CD-R, and laser light having a wavelength of 650 nm or 635 nm is used for a DVD-RAM. Thus, an optical recording/pickup head compatible with a CD-R and a DVD includes at least two light sources which emit laser light having respectively different wavelengths.

Figure 1:
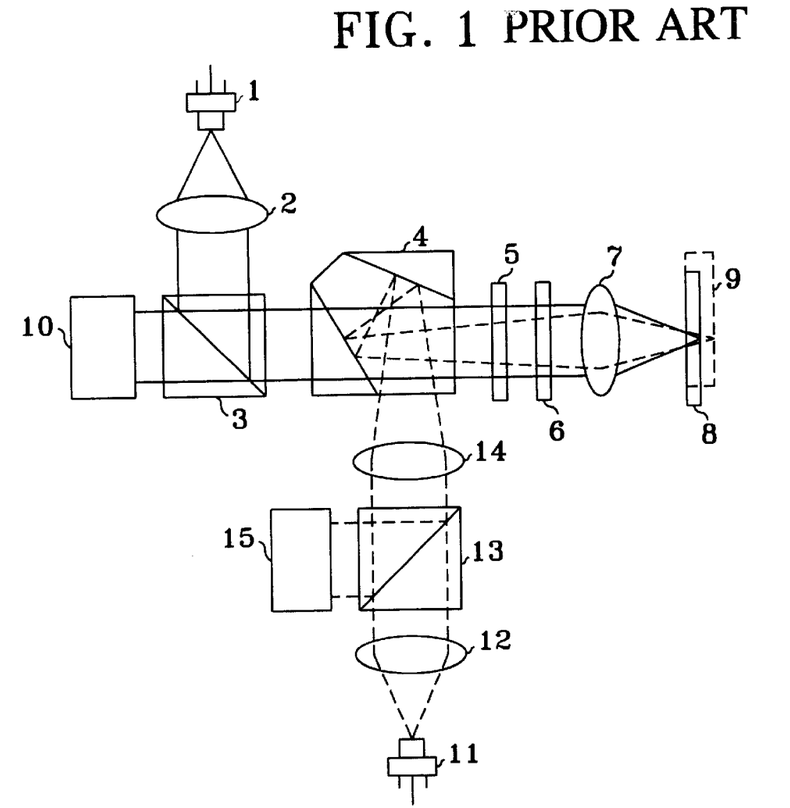
FIG. 1 is a view illustrating an optical system of a conventional optical recording/pickup head compatible with a digital versatile disk (DVD) and a recordable compact disk (CD-R)

FIG. 1 shows an optical system of a conventional optical recording/pickup head compatible with a CD-R and a DVD. The optical recording/pickup head includes a light source 1 for emitting a first light beam having a wavelength of 635 nm for the recording and reproduction of information with respect to a digital versatile disk (DVD) 8, a light source 11 for emitting a second light beam having a wavelength of 780 nm for the recording and reproduction of information with respect to a recordable compact disk (CD-R) 9, and an objective lens 7 for respectively focusing the first and second light beams emitted from the First and second light sources 1 and 11 on the information recording surfaces of the DVD 8 and the CD-R 9, respectively. A collimating lens 2 collimates the first light beam emitted from the first light source 1 into a parallel light beam and transmits the collimated light to a beam splitter 3. The beam splitter 3 reflects the first light beam incident from the collimating lens 2 to an interference filter prism 4, and the interference filter prism 4 transmits the first light beam, which is a parallel light beam incident from the beam splitter 3, to a quarter-wave plate 5. In more detail, the interference filter prism 4 totally transmits or reflects the incident light beam according to a wavelength of the incident light beam, in which a first light beam of a 635 nm wavelength for a DVD is totally transmitted and a second light beam of a 780 nm wavelength incident from a convergent lens 14 is totally reflected. A thin-film type variable aperture 6 transmits the first light beam, which is the parallel light beam incident from the quarter-wave plate 5, to the objective lens 7. The objective lens 7 focuses the first light beam of the 635 nm wavelength incident in the parallel beam form on the information recording surface of the DVD 8 having a thickness of 0.6 mm. As a result, the first light beam focused on and reflected from the information recording surface of the DVD 8 by the objective lens 7 contains information recorded on the focused position. The reflected first light beam from the information recording surface of the DVD 8 passes through the objective lens 7, the variable aperture 6 and the quarter-wave plate 5, in sequence, and then is incident to the interference filter prism 4. The interference filter prism 4 transmits the first light beam incident from the quarter-wave plate 5 to the beam splitter 3, and the beam splitter 3 makes the first light beam incident from the interference filter prism 4 proceed to a photodetector 10. The photodetector 10 receives the first light beam from the beam splitter 3 and detects information from the first light beam.

The second light beam of the 780 nm wavelength which is emitted from the light source 11 passes through a collimating lens 12 and a beam splitter 13, and then is incident to the convergent lens 14. The convergent lens 14 converges the second light beam incident from the beam splitter 13 to transmit the second light beam to the interference filter prism 4 in the form of a converged beam. The interference filter prism 4 transmits the second light beam incident from the convergent lens 14 to the quarter-wave plate 5 in the form of a divergent beam. The quarter-wave plate 5 transmits the second light beam incident from the interference filter prism 4 to the variable aperture 6. The variable aperture transmits only part of the second light beam of the 780 nm wavelength, and transfers the transmitted second light beam to the objective lens 7 in the form of a divergent beam. The reason why the second light beam is incident to the objective lens 7 in the divergent form, is to focus the second light beam on the information recording surface of the CD-R 9 without having any optical aberration. The variable aperture 6 used in the optical recording/pickup head shown in FIG. 1 will be described in detail with reference to FIG. 2.

Figure 2:
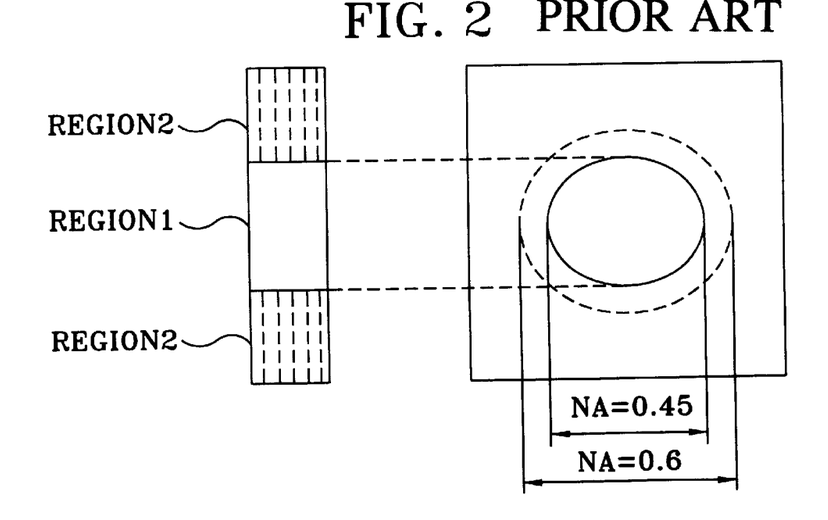
FIG. 2 is a view explaining a variable aperture having a thin film structure used in the optical recording/pickup head shown in FIG. 1.

FIG. 2 shows in detail the thin-film type variable aperture 6 shown in FIG. 1. The thin-film type variable aperture 6, as shown in FIG. 2, has a structure which can selectively transmit the light beams incident to the regions whose numerical aperture (NA) is less than or equal to 0.6. Among two regions, region 1 is the region whose numerical aperture (NA) is less than or equal to 0.45 and which totally transmits the incident light beam of 780 nm wavelength and 635 nm wavelength. Region 2 is a region having a numerical aperture (NA) of more than 0.45, in which a dielectric thin film is coated. The region 2 is made of a multi-layered thin-film having a thickness of micrometer ($\mu$m) order, in which the light beam having the 635 nm wavelength is totally transmitted and that having the 780 nm wavelength is totally reflected. The region 1 is comprised of a quartz ($SiO_2$) thin film in order to remove any optical aberration generated by the dielectric thin film coated region 2. The variable aperture 6 having such a transmission characteristic totally transmits the 780 nm wavelength light being incident there to the region 1 having the 0.45 NA or below and then passes the transmitted light to the objective lens 7, and totally reflects the 780 nm wavelength light incident to the region 2 having the 0.45 NA or above.

The objective lens 7 focuses the second light beam incident from the variable aperture 6 on the information recording surface of the CD-R 9 having a thickness of 1.2 mm, and then forms a beam spot including a main lobe and a side lobe on the information recording surface of the CD-R 9. The reflected second light beam from the information recording surface of the CD-R 9 is transmitted to, the objective lens 7, the variable aperture 6 and the quarter-wave plate 5, in sequence, and then goes to the interference filter prism 4. The interference filter prism 4 reflects the second light beam incident from the quarter-wave plate 5 to the convergent lens 14, and the convergent lens 14 makes the converged second light beam incident to the beam splitter 13. The beam splitter 13 makes the second light beam incident from the convergent lens 14 proceed to a photodetector 15. The photodetector 15 receives the second light beam from the beam splitter 13 and detects information therefrom. Accordingly, the optical system of an optical head of FIG. 1 is capable of performing recording and reproduction with regard to both DVD 8 and CD-R 9

However, the optical recording/pickup head of FIG. 1 forms a beam spot having a side lobe on the information recording surface of the CD-R 9 to thereby generate a crosstalk. Furthermore, the variable aperture 6 is formed so that the light passing through the region 1 and that passing through the region 2 have the same phase difference with each other, in which the region 1 is coated by a quartz thin film and the region 2 is coated by multi-layered dielectric thin film having a thickness of the micrometer order. However, such a fabricating process becomes complicated, and thus causes an increase in production cost.

SUMMARY OF THE INVENTION

In order to solve the problems, an object of the present invention is to provide an optical recording/pickup head, including a holographic variable aperture having a first region for totally transmitting incident light beams having respective different wavelengths to an objective lens, and a second region for totally transmitting a light beam having a relatively shorter wavelength, transmitting part of a light beam having the longer wavelength to the objective lens and diffracting the remaining part of a light beam of the longer wavelength, and an objective lens for focusing light beams incident from the variable aperture on the information recording surface of a corresponding optical disk so that a beam spot having a main lobe is formed on the information recording surface of a recordable compact disk (CD-R) and a digital versatile disk (DVD).

Additional objects and advantages of the present invention will be set forth in part in the description which follows and, in part, will be obvious from the description, or may be learned by practice of the invention.

To accomplish the above and other objects of the present invention, there is provided n optical recording/pickup head for use with at least two types of optical disks, in which distances from the optical recording/pickup head to the information recording surfaces differ from each other, and information is recorded and reproduced by light beams having respectively different wavelengths, the optical recording/pickup head including a first light source; a first photodetector; a second light source; a second photodetector; an objective lens to focus the first light beam and the second light beam and forms a beam spot on the respective information recording surfaces of two optical disks; optical path alteration means to transfer the first light beam incident from the first light source to the objective lens and to transfer the first light beam incident from the objective lens to the first photodetector, and to transfer the second light beam incident from the second light source to the objective lens and to transfer the second light beam incident from the objective lens to the second photodetector, respectively; and a variable aperture, located on an optical path between the optical path alteration means and the objective lens, to totally transmit the first light beam incident from the optical path alteration means to the objective lens, and to transmit part of the second light beam incident from the optical path alteration means to the objective lens, wherein the objective lens focuses the first and second light beams incident from the optical path alteration means on the information recording surface of a corresponding optical disk so that the beam spot having a main lobe is formed on the respective information recording surfaces of the two types of optical disks, respectively.

BRIEF DESCRIPTION OF THE DRAWINGS

These and other objects and advantages of the invention will become apparent and more readily appreciated from the following description of the preferred embodiments, taken in conjunction with the accompanying drawings of which.

DETAILED DESCRIPTION OF THE PREFERRED EMBODIMENTS

Reference will now made in detail to the present preferred embodiments of the present invention, examples of which are illustrated in the accompanying drawings, wherein like reference numerals refer to the like elements throughout. The embodiments are described below in order to explain the present invention by referring to the figures.

Figure 3:
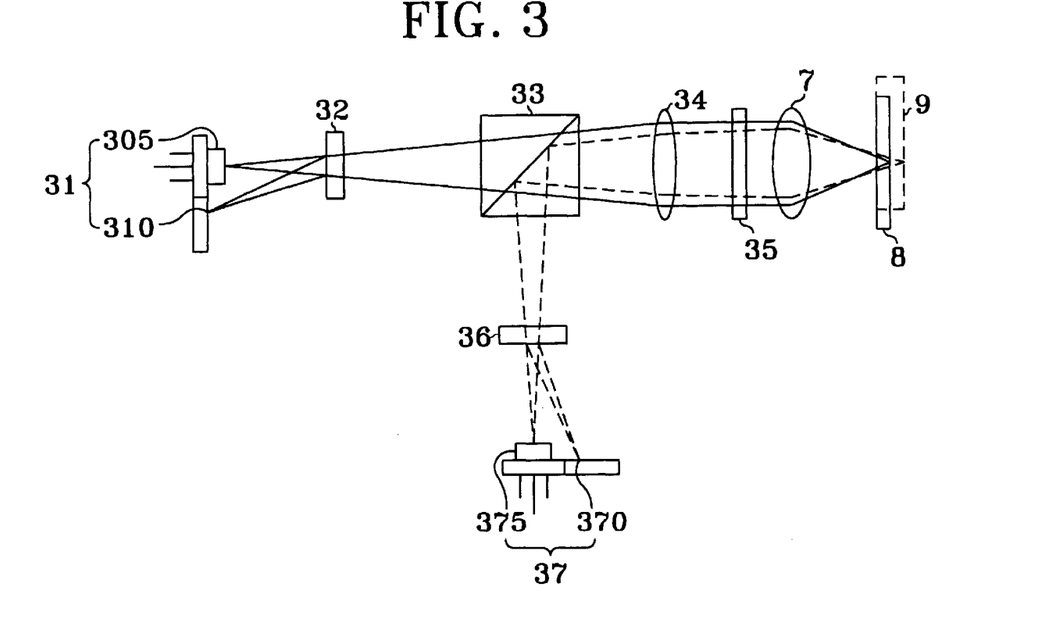
FIG. 3 is a view showing an optical system of an optical recording/pickup head compatible with a DVD and a CD-R according to a first embodiment of the present invention.

FIG. 3 shows an optical recording/pickup head compatible with a DVD and a CD-R according to a first embodiment of the present invention.

The optical recording/pickup head shown in FIG. 3 includes a first light source and photodetector 31 integrally incorporated into a single unit in which a first light source 305 emits a first light beam having a 635 nm wavelength and a first photodetector 310 detects information from the first light beam reflected from a digital versatile disk (DVD) 8, a second light source and photodetector 37 integrally incorporated into a single unit in which a second light source 375 emits a second light beam having a 780 nm wavelength and a second photodetector 370 detects information from the second light beam reflected from a recordable compact disk (CD-R) 9, an objective lens 7 for focusing the first light beam and the second light beam on the respective information recording surfaces of an optical disks 8 and 9, respectively, and a beam splitter 33 for transferring the first light beam emitted from the first light source 305 and the second light beam emitted from the second light source 375 to the objective lens 7, and transferring the reflected first and second light beams to photodetectors 310 and 370, respectively.

The first light source 305 emits the first light beam of the 635 nm wavelength. A first holographic beam splitter 32 transmits the first light beam incident from the first light source 305 to the beam splitter 33. The beam splitter 33 which has an optical characteristic for totally transmitting the first light beam of the 635 nm wavelength, totally transmits the first light beam incident from the first light source 305 to a collimating lens 34. The collimating lens 34 collimates the first light beam incident from the beam splitter 33 in the form of a parallel light beam, and then the collimated light is transmitted to a holographic variable aperture 35. The holographic variable aperture 35 totally transmits the first light beam incident from the collimating lens 34, and the transmitted light beam proceeds to the objective lens 7. The objective lens 7 focuses the first light beam incident from the holographic variable aperture 35 on the information recording surface of the DVD 8, which has a predetermined focal distance for forming a beam spot in which the spot size is almost 0.9 μm on the information recording surface of the DVD 8 having a thickness of 0.6 mm. As a result, the reflected first light beam from the DVD 8 contains information recorded at a position focussed on the information recording surface of the DVD 8. The first light beam reflected from the DVD 8 is transmitted through the objective lens 7, holographic variable aperture 35 and the collimating lens 34, in sequence, and then proceeds to the beam splitter 33. The beam splitter 33 totally transmits the first light beam of the 635 nm wavelength incident from the collimating lens 34 and makes the transmitted light beam proceed to the first holographic beam splitter 32. The first holographic beam splitter 32 diffracts the first light beam, and the first photodetector 310 detects information from the first light beam diffracted by the first holographic beam splitter 32.

The second light source 375 emits the second light beam having the 780 nm wavelength. A second holographic beam splitter 36 transmits the second light beam incident from the second light source 375 to the beam splitter 33. The beam splitter 33 which has an optical characteristic for totally reflecting the second light beam of the 780 nm wavelength, totally reflects the second light beam incident from the second light source 375 to the collimating lens 34. The collimating lens 34 collimates the second light beam incident from the first beam splitter 33 in the form of a slightly divergently parallel beam, and then the collimated light is transmitted to the holographic variable aperture 35. The holographic variable aperture 35 transmits part of the second light beam incident from the collimating lens 34 to the objective lens 7. The holographic variable aperture 35 will be described in detail with reference to FIGS. 4A, 4B, 5 and 6.

Figure 4A:
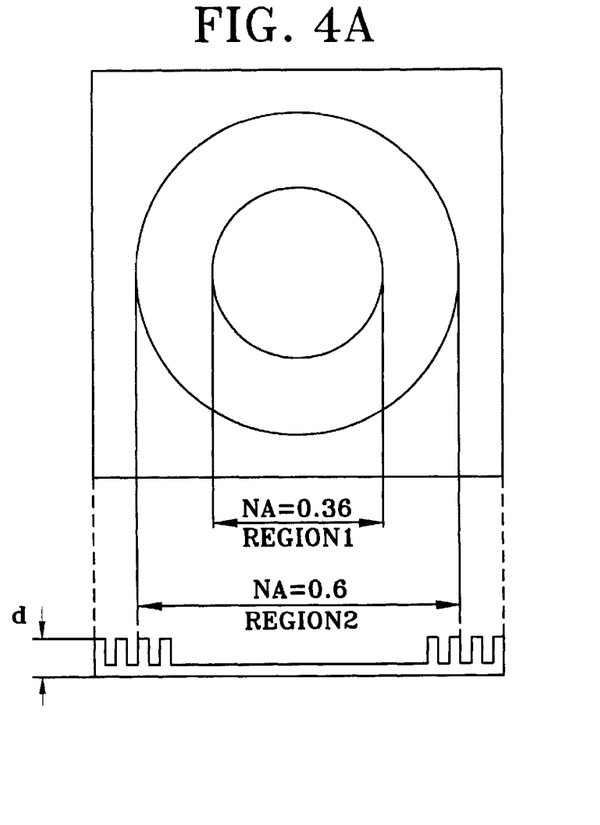
FIG. 4A is a view showing the structure of a two-divisional holographic variable aperture used in the optical recording/pickup head shown in FIG. 3.

FIG. 4A shows the structure of a two-divisional holographic variable aperture used as the holographic variable aperture 35. In the holographic variable aperture 35, a first region, REGION 1, has a numerical aperture (NA) which is less than or equal to 0.36, and a second region, REGION 2 has a numerical aperture (NA) which is more than or equal to 0.36. The region 2 has a diffraction grating pattern having a depth of almost 2.54 μm, and each slit forming this diffraction grating pattern is disposed in a concentric circle shape centered about the optical center of the two-divisional holographic variable aperture. The 2.54 μm depth of the diffraction grating is one of the values satisfying the following equation (1) indicating the depth that the incident light of the 635 nm wavelength is not diffracted and totally transmitted, and a depth of the diffraction grating in which a refractive index is 1.5.

$$d=m\lambda/(n-1) \tag{1}$$

Here, a symbol d is the depth of a diffraction grating, λ is a wavelength of the incident light, n denotes a refractive index of the diffraction grating, and m is an integer. The two-divisional holographic variable aperture is located at the optical recording/pickup head shown in FIG. 3 so that the diffraction grating faces the first beam splitter 33.

Figure 5:
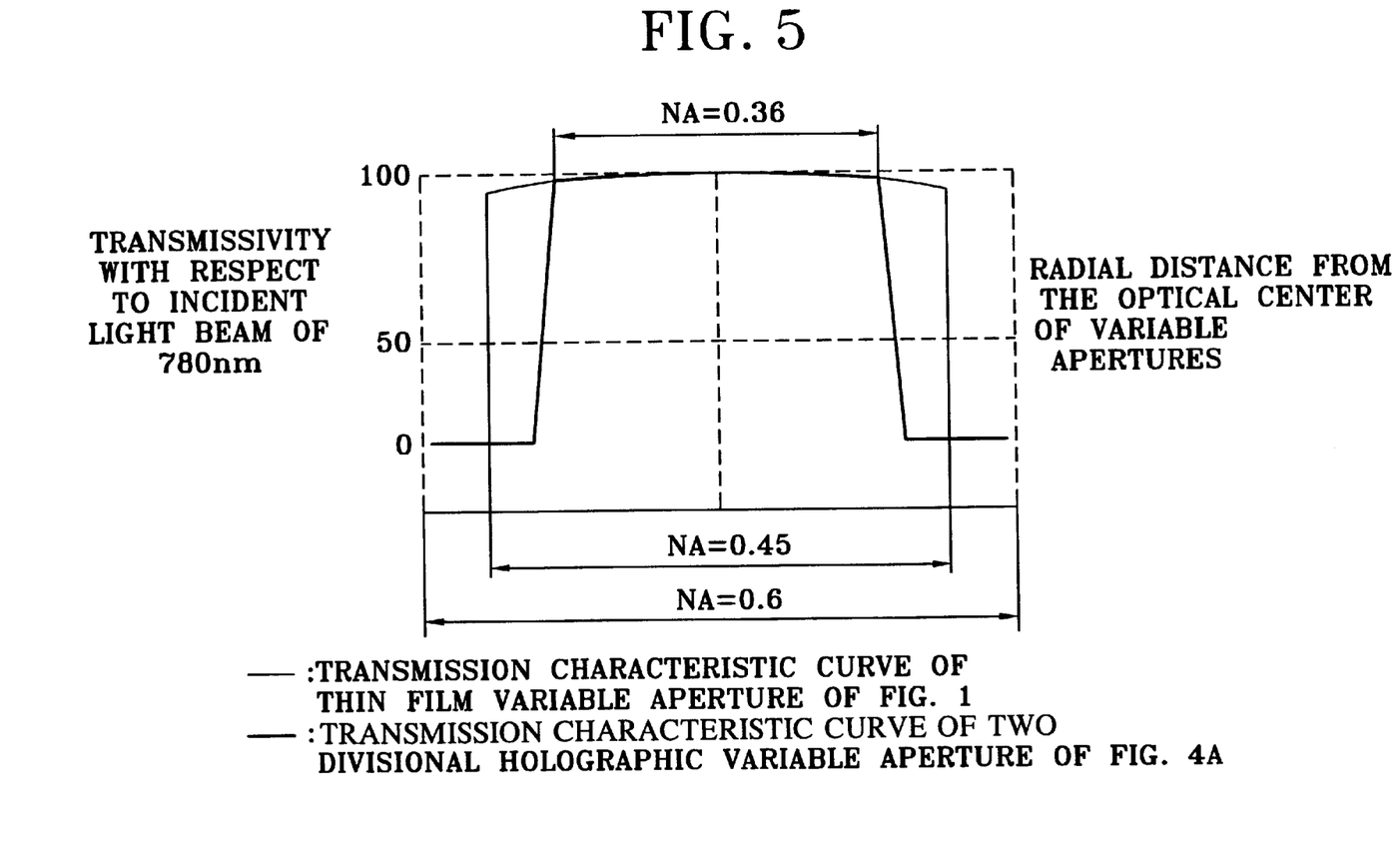
FIG. 5 is a view showing a transmission characteristic with respect to an incident light beam having a 780 nm wavelength of a thin film variable aperture and a two-divisional holographic variable aperture.

FIG. 5 is a view showing a transmission characteristic with regard to the incident light of the 780 nm wavelength of both the thin film type variable aperture 6 (shown in FIG. 2) and the two-divisional holographic variable aperture (shown in FIG. 4A). A horizontal axis is a radial distance of a light receiving surface, in which a distance value of zero denotes an optical center of both variable apertures. A vertical axis denotes a transmissivity with regard to the incident light beam of the 780 nm wavelength, in which a thick solid line represents a curve showing a transmission characteristic of the two-divisional holographic variable aperture. This curve represents a transmission characteristic that the two-divisional holographic variable aperture almost totally transmits the light beam of the 780 nm wavelength incident to the region whose numerical aperture (NA) is less than or equal to 0.36, and transmits almost 25% of the light beam of the 780 nm wavelength incident to the region whose numerical aperture (NA) is more than or equal to 0.36. A thin solid line is a curve showing a transmission characteristic of the thin film type variable aperture 6 used in the conventional optical recording/pickup head. This curve represents a transmission characteristic that the variable aperture 6 almost totally transmits the light beam of the 780 nm wavelength incident to the region whose numerical aperture (NA) is less than or equal to 0.45, and transmits almost 0.01% of that of the 780 nm wavelength incident to the region whose numerical aperture (NA) is more than 0.45.

Figure 4B:
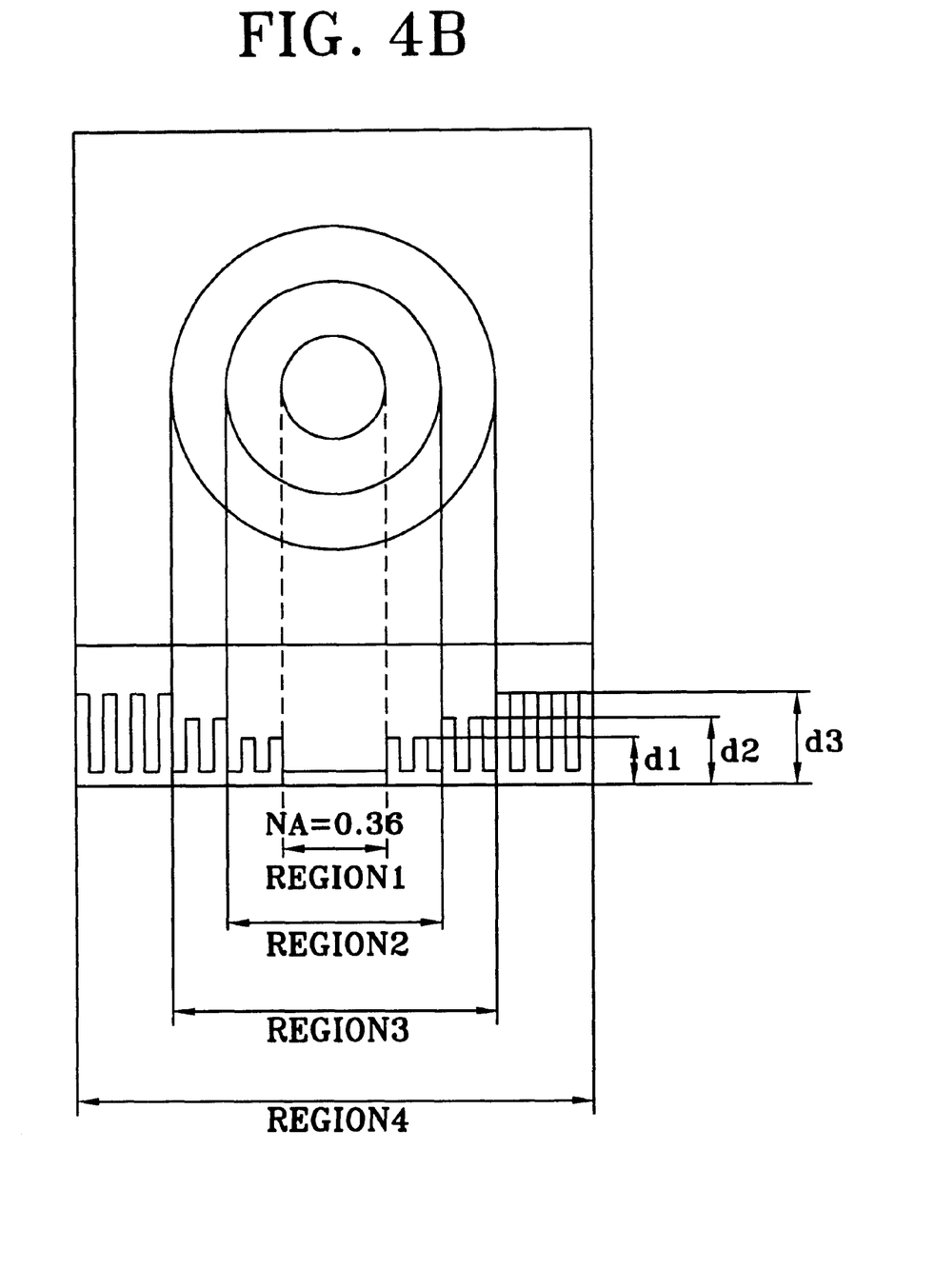
FIG. 4B is a view showing a multi-divisional holographic variable aperture used in the optical recording/pickup head shown in FIG. 3.

FIG. 4B shows a multi-divisional holographic variable aperture used as the holographic variable aperture 35. A first region in the multi-divisional holographic variable aperture includes no diffraction grating, but second, third and fourth regions therein include diffraction gratings. The diffraction gratings of the other regions excluding the first region are etched to respectively different depths. The depths d1, d2 and d3 of each diffraction grating are 1.27 μm, 2.54 μm and 3.81 μm, respectively. The multi-divisional holographic variable aperture is located at the optical recording/pickup head shown in FIG. 3 so that the diffraction grating faces the first beam splitter 33. The multi-divisional holographic variable aperture will be described with reference to FIG. 6.

Figure 6:
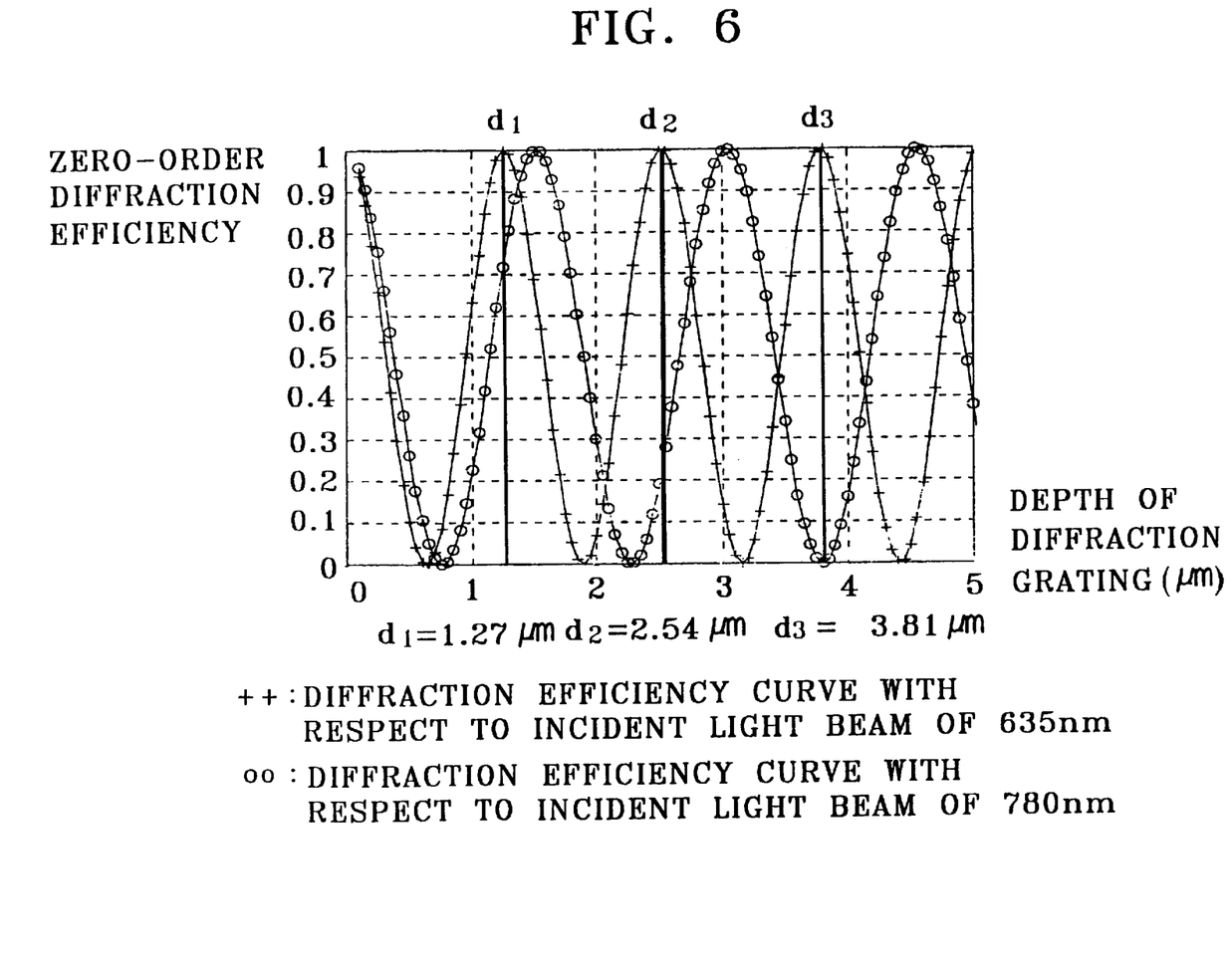
FIG. 6 is a graphical view showing a zero-order diffraction efficiency according to variation of diffraction grating depth.

FIG. 6 is a graphical diagram showing a zero-order diffraction efficiency according to variation of diffraction grating depth. A horizontal axis indicates a depth of the diffraction grating, and a vertical axis represents a zero-order diffraction efficiency with respect to the incident light. The zero-order diffraction efficiency represents light quantity of a transmitted light beam as a ratio to light quantity of the incident light, maintaining the original proceeding direction to which a light beam is incident. A zero-order diffraction efficiency of '1' denotes that the incident light is not diffracted and is totally transmitted in the proceeding direction to which the light is incident. The zero-order diffraction efficiency of '0' indicates that the incident light is totally diffracted. A curve of a zero-order diffraction efficiency with respect to the incident light of the 635 nm wavelength represents that the zero-order diffraction efficiency is all '1' when the depths of the diffraction gratings are 1.27 $\mu$m, 2.54 $\mu$m, 3.81 $\mu$m and 5.08 $\mu$m, respectively. A curve of a zero-order diffraction efficiency with respect to the incident light of the 780 nm wavelength represents that the zero-order diffraction efficiency is about 0.71, 0.25 and 0.01, respectively when the depths of the diffraction gratings are 1.27 $\mu$m, 2.54 $\mu$m and 3.81 $\mu$m, respectively.

In the case that the two-divisional holographic variable aperture of FIG. 4A is employed as the holographic variable aperture 35 of the optical recording/pickup head shown in FIG. 3, the holographic variable aperture 35 totally transmits the second light beam incident to the region whose numerical aperture (NA) is less than or equal to 0.36 from the collimating lens 34, and transmits about 25% of the second light beam incident to the region whose numerical aperture (NA) is more than 0.36, and then the transmitted light beam is transferred to the objective lens 7. On the other hand, in the event that the multi-divisional holographic variable aperture of FIG. 4B is applied as the holographic variable aperture 35 of the optical recording/pickup head shown in FIG. 3, the holographic variable aperture 35 totally transmits the second light beam incident to the region whose numerical aperture (NA) is less than or equal to 0.36 from the collimating lens 34, and transmits the second light beam incident to the regions whose numerical aperture (NA) is more than 0.36 in which the farther the incident second light beam is away from the optical center of the holographic variable aperture 35, the less the light is transmitted, and then the transmitted light beam is transferred to the objective lens 7. The objective lens 7 focuses the second light beam incident from the holographic variable aperture 35 on the information recording surface of the CD-R 9.

The second light beam which is focused on and reflected from the information recording surface of the CD-R 9 by the objective lens 7 passes through the objective lens 7, the holographic variable aperture 35 and the collimating lens 34, in sequence, and then is incident to the beam splitter 33. The beam splitter 33 totally reflects the second light beam incident from the collimating lens 34 to the second holographic beam splitter 36. The second holographic beam splitter 36 diffracts the second light beam incident from the beam splitter 33, and the second photodetector 370 detects information from the second light beam diffracted by the second holographic beam splitter 36.

Figure 7:
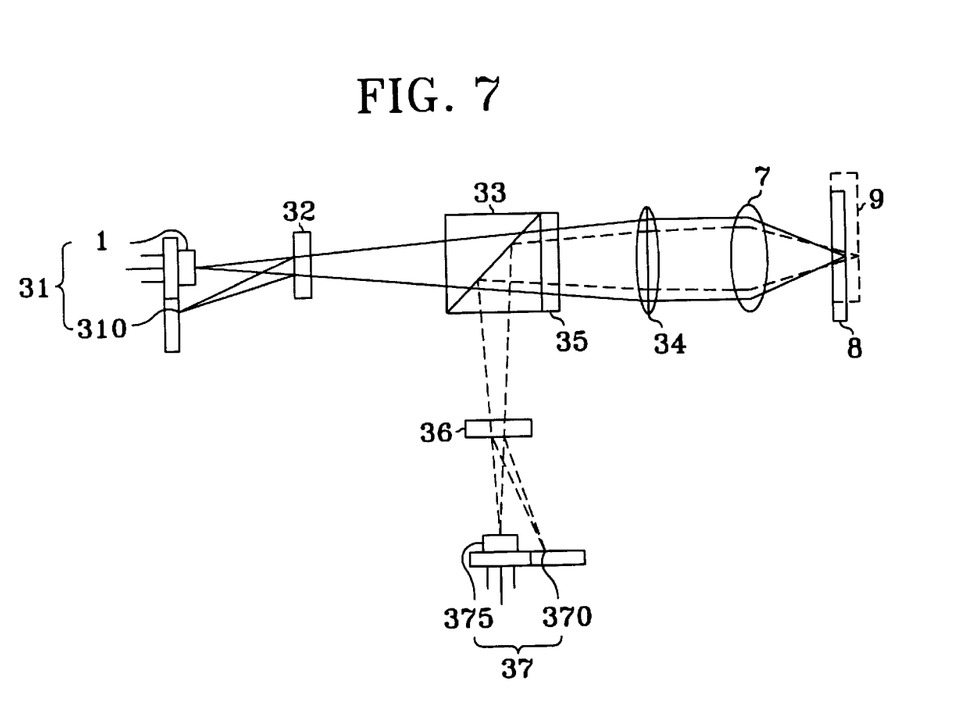
FIG. 7 is a view showing an optical system of an optical recording/pickup head compatible with a DVD and a CD-R according to a second preferred embodiment of the present invention.

FIG. 7 shows the construction of an optical recording/pickup head compatible with a DVD and a CD-R according to a second embodiment of the present invention. The optical recording/pickup head of FIG. 7 shows a structure wherein the position of the holographic variable aperture 35 in the optical recording/pickup head of FIG. 3 is changed, and the holographic variable aperture 35 is positioned on an optical path between the collimating lens 34 and the beam splitter 33, compared with the optical recording/pickup head of FIG. 3. The construction and functions of other optical components in FIG. 7 are the same as those of FIG. 3 which are denoted by the same reference numerals. Accordingly, the optical recording/pickup head performs the same operation of recording information on the DVD 8 and the CD-R 9 and detecting the information therefrom as performed by the optical recording/pickup head shown in FIG. 3. As a result, the optical recording/pickup heads of FIGS. 3 and 7 form a beam spot in which the spot size is almost 0.9 $\mu$m, which is appropriate for the DVD 8 on the information recording surface thereof, so as to record and reproduce information on the information recording surface thereof with regard to the first light beam. Also, the optical recording/pickup heads form a beam spot in which the spot size is 1.4 $\mu$m appropriate for the CD-R 9 on the information recording surface thereof, so as to record and reproduce information on the information recording surface thereof with regard to the second light beam.

Figure 8A:
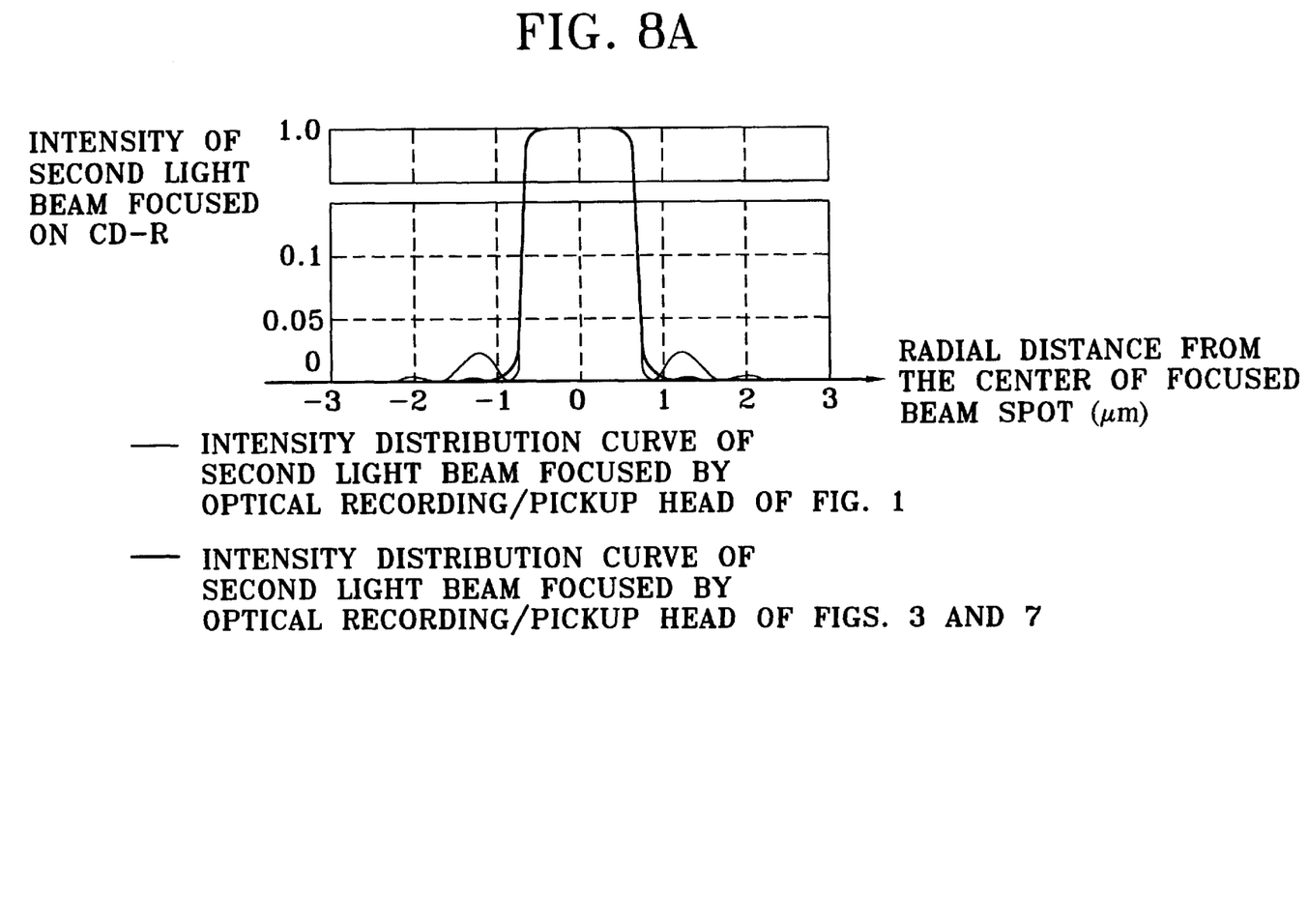
FIG. 8A is a graphical view showing intensity distribution of a second light beam focused on the information recording surface of a CD-R.

FIG. 8A shows an intensity distribution of the second light beam focused on the information recording surface of a CD-R 9 with respect to a radial distance of a beam spot. A horizontal axis of the graph indicates a radial distance from the center of the beam spot focused on the information recording surface, in which a distance value of "0" denotes the center of the beam spot. The positive value and negative values on the horizontal axis and having the same absolute value represent positions which are apart from the center of a beam spot by a distance of the absolute value, and located in opposite directions.

A vertical axis of the graphical view represents intensities of the focused second light beam as a normalized value, in which the maximum value of '1' is the intensity of light at the center of the beam spot, and a thin solid line thereof is a curve indicating the intensity of the second light beam focussed by the optical recording/pickup head of FIG. 1. This curve shows that the beam spot focussed by the optical recording/pickup head of FIG. 1 has a main lobe of intensity close to approximately '1' in a radial distance of the beam spot ranging from −0.7 $\mu$m to 0.7 $\mu$m, and side lobes of intensity close to 0.025 and 0.005 in a radial distance of the beam spot about ±1.2 $\mu$m and ±2.0 $\mu$m, respectively. A thick solid line in the graphical view indicates intensities of the second light beam which is focused by the optical recording/pickup heads of FIGS. 3 and 7. This curve shows that the beam spot focused on the information recording surface of the CD-R 9 by the optical recording/pickup head of FIGS. 3 and 7 has a main lobe of intensity close to almost '1' with regard to the radial distance thereof from about −0.7 $\mu$m to about 0.7 $\mu$m. A shape of this beam spot on the information recording surface of the CD-R 9 has no side lobes and is symmetrical to the center of the beam spot.

Figure 8B:
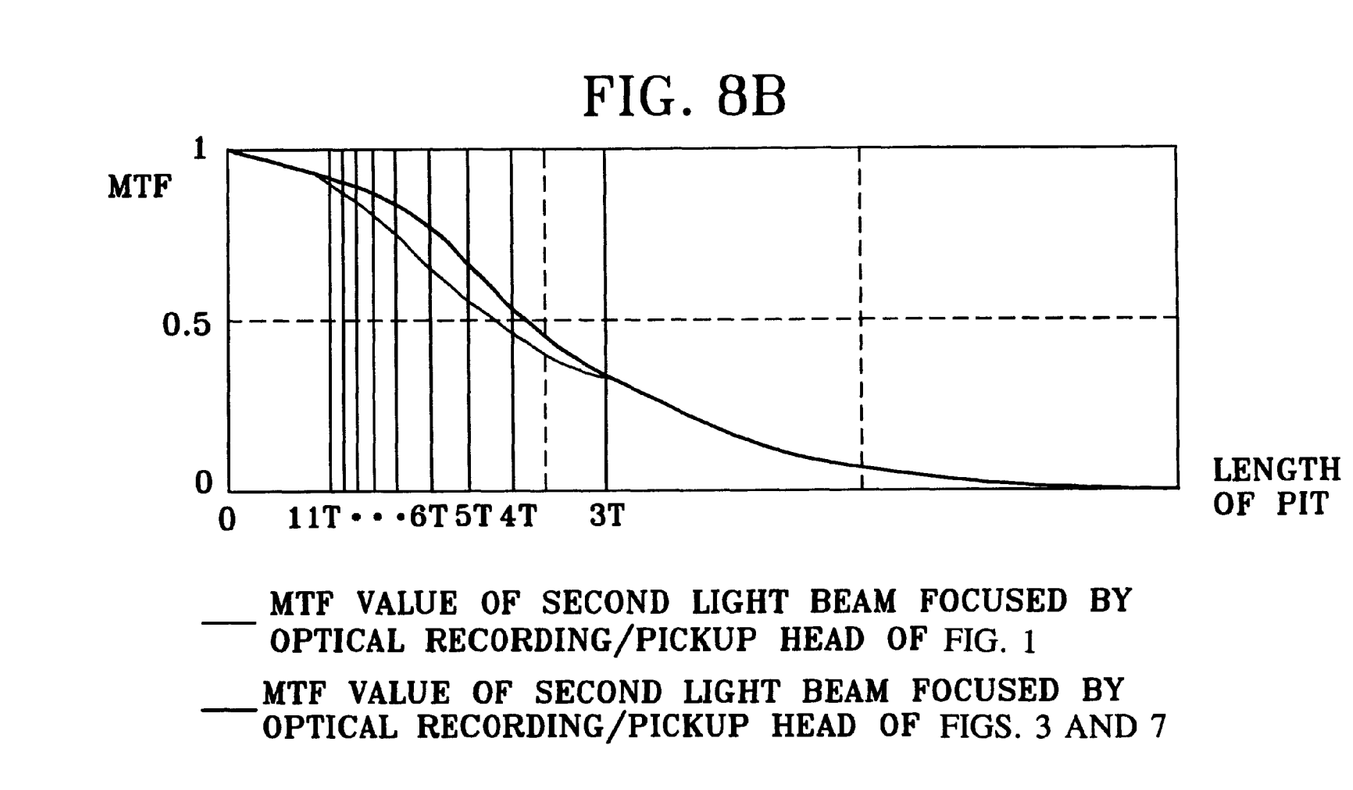
FIG. 8B is a graphical view showing a modulation transfer function (MTF) value of a second light beam focused on the information recording surface of a CD-R.

FIG. 8B shows a modulation transfer function (MTF) value of the second light beam focused on the information recording surface of a CD-R 9. A horizontal axis in the graphical view indicates the length of a pit and a vertical axis therein represents the MTF value. A thin solid line therein represents an MTF value of the second light beam focused by the recording/pickup head of FIG. 1, which shows the focused second light beam to be modulated to light having an MTF value more than 0.4 with respect to pits of 3T to 11T in length. A thick solid line therein represents a MTF value of the second light beam focused by the optical recording/pickup head of FIGS. 3 and 7, which shows the focused second light beam to be modulated to light having a MTF value more than 0.45 with respect to pits of 3T to 11T in length. The MTF value of the second light beam focused by the optical recording/pickup head of FIGS. 3 and 7 is higher than the MTF value of the second light beam focused by the optical recording/pickup head of FIG. 1 with respect to all pits of 3T to 11T in length.

As described above, an optical recording/pickup head according to the present invention forms a beam spot having a high MTF value on each information recording surface of a DVD 8 and a CD-R 9, to thereby provide information resolution. The optical recording/pickup head forms a beam spot having only a main lobe on the information recording surface of the DVD 8 and the CD-R 9 to thus prevent a crosstalk caused by a side lobe, and also provides the easier construction of an optical system and less manufacturing costs by using a holographic variable aperture which is easier in manufacturing than a thin film type variable aperture constructed with a multi-layered thin film having a thickness of a micrometer order. Furthermore, in the optical recording/pickup head shown in FIG. 7, the holographic variable aperture 35 is located between the first beam splitter 33 and the collimating lens 34, and an actuator (not shown) drives only the objective lens 7. Therefore, the optical recording/pickup head shown in FIG. 7 can reduce the load to the actuator which drives the objective lens 7, in comparison with the conventional optical recording/pickup head in which both the thin film type variable aperture 6 (see FIG. 1) and the objective lens 7 are driven by the actuator, thereby reducing the load of the actuator which drives an objective lens 7.

While only certain embodiments of the invention have been specifically described herein, it will be apparent that numerous modifications may be made thereto without departing from the spirit and scope of the invention.

What is claimed is:

1. An optical recording/pickup head for use with first and second types of optical disks, in which distances from the optical recording/pickup head to the information recording surfaces of the first and second types of optical disks differ from each other, and information is recorded and reproduced by first and second light beams having respectively different wavelengths, the optical recording/pickup head comprising:
 a first light source to emit the first light beam;
 a first photodetector;
 a second light source to emit the second light beam;
 a second photodetector;
 an objective lens to focus the first light beam and the second light beam as beam spots on the respective information recording surfaces of the first and second types of optical disks;
 optical path alteration means to transfer the first light beam incident from the first light source to the objective lens and to transfer the first light beam reflected from the first type optical disk and incident from the objective lens to the first photodetector, and to transfer the second light beam incident from the second light source to the objective lens and to transfer the second light beam reflected from the second type optical disk and incident from the objective lens to the second photodetector, and
 a variable aperture, located on an optical path between the optical path alteration means and the objective lens, to totally transmit the first light beam incident from the optical path alteration means to the objective lens, and to transmit only part of the second light beam incident from the optical path alteration means to the objective lens,
 wherein the objective lens focuses the first and second light beams incident from the optical path alteration means and transmitted by the variable aperture on the information recording surfaces of the first and second types of optical disks, respectively, so that the beam spots each have a main lobe formed on the respective information recording surfaces of the first and second types of optical disks.

2. The optical recording/pickup head according to claim 1, wherein said optical path alteration means comprises:
 a beam splitter to totally transmit the first light beam incident from the first light source, and to totally reflect the second light beam incident from the second light source; and
 a collimating lens to collimate the first and second light beams incident from the beam splitter in the form of parallel light beams and to transmit the parallel light beams to the variable aperture.

3. The optical recording/pickup head according to claim 2, wherein said beam splitter totally transmits the first light beam from the first light source and totally reflects the second light beam from the second light source, based upon wavelengths of the incident first and second light beams.

4. The optical recording/pickup head according to claim 2, wherein said variable aperture comprises:
 a first region to totally transmit the first and second light beams incident from the collimating lens; and
 a second region, surrounding the first region and centered about an optical center of the variable aperture, to totally transmit the first light beam incident from the collimating lens to the objective lens, to transmit part of the second light beam incident from the collimating lens to the objective lens, and to diffract a remaining part of the second light beam incident from the collimating lens.

5. The optical recording/pickup head according to claim 4, wherein said second region has a transmission characteristic such that the farther the second light beam incident from the collimating lens is from the optical center of the variable aperture, the less the second region transmits the second light beam.

6. The optical recording/pickup head according to claim 5, wherein said second region comprises diffraction gratings disposed to face the beam splitter, wherein the diffraction gratings are engraved so as to increase in depth as a distance from the optical center of the variable aperture increases.

7. The optical recording/pickup head according to claim 1, further comprising a collimating lens disposed between the variable aperture and the objective lens, to collimate the first light beam and the second light beam incident from the variable aperture in the form of respective parallel light beams.

8. The optical recording/pickup head according to claim 7, wherein said variable aperture comprises:
 a first region, disposed on an optical path facing from the optical path alteration means and toward the collimating lens, to totally transmit the first and second light beams incident from the optical path alteration means to the collimating lens; and
 a second region, surrounding the first region and centered about an optical center of the variable aperture, to totally transmit the first light beam incident from the optical path alteration means, to transmit part of the second light beam incident from the optical path alteration means to the collimating lens, and to diffract a remaining part of the second light beam incident from the optical path alteration means.

9. The optical recording/pickup head according to claim 8, wherein said second region has a transmission characteristic such that the farther the second light beam incident from optical path alteration means is from the optical center of the variable aperture, the less the second region transmits the second light beam.

10. The optical recording/pickup head according to claim 9, wherein said second region comprises diffraction gratings disposed to face the optical path alteration means, wherein the diffraction gratings are engraved so as to increase in depth as a distance from the optical center of the variable aperture increases.

11. The optical recording/pickup head according to claim 1, further comprising:

a first holographic beam splitter to transmit the first light beam emitted from the first light source to the optical path alteration means, and to diffract the first light beam incident from the optical path alteration means toward the first photodetector; and a second holographic beam splitter to transmit the second light beam emitted from the second light source to the optical path alteration means, and to diffract the second light beam incident from the optical path alteration means toward the second photodetector;

wherein the first photodetector detects information from the first light beam diffracted by the first holographic beam splitter, and the second photodetector detects information from the second light beam diffracted by the second holographic beam splitter; and wherein the first light source and the first photodetector, and the second light source and the second photodetector are integrally incorporated into a single unit, respectively.

12. The optical recording/pickup head according to claim in 1, wherein the first and second types of optical disks are a digital versatile disk (DVD) and a recordable compact disk (CD-R), respectively.

13. An optical head compatible with first and second types of optical disks, wherein distances from the optical head to respective information recording surfaces of the first and second types of optical disks differ from each other, and information is at least one of recorded and reproduced by first and second light beams having different wavelengths from each other, the optical head comprising:

a variable aperture to totally transmit the first light beam and to transmit only part of the second light beam; and an objective lens to focus the totally transmitted first light beam and the part of the second light beam from the variable aperture as beam spots on the respective information recording surfaces of the first and second types of optical disks.

14. The optical head as claimed in claim 13, wherein the variable aperture comprises:

a first region, centered about an optical center of the variable aperture, to totally transmit the first and second light beams incident thereto; and a second region, surrounding the first region and centered about the optical center, to totally transmit the first beam incident thereto, to transmit part of the second light beam incident thereto, and to diffract a remaining part of the second light beam incident thereto.

15. The optical head as claimed in claim 14, wherein the second region comprises a diffraction grating pattern with slits disposed in concentric circles centered about the optical center.

16. The optical head as claimed in claim 14, wherein the first region has a first numerical aperture no greater than 0.36, the second region has a second numerical aperture greater than 0.36, and the second region transmits approximately 25 percent of the second light beam incident thereto.

17. The optical head as claimed in claim 15, wherein the slits have a depth based upon:

$$d = m\lambda/(n-1);$$

wherein d is the depth of the slits, $\lambda$ is a wavelength of incident light, n is a refractive index of the diffraction grating, and m is an integer.

18. The optical head as claimed in claim 15, wherein the slits have a same depth as one another, the first light beam has a wavelength of approximately 635 nm or 650 nm, the second light beam has a wavelength of approximately 780 nm, and the depth of the slits is approximately 2.54 µm.

19. The optical head as claimed in claim 15, further comprising:

a first light source to emit the first light beam;

a first photodetector;

a second light source to emit the second light beam;

a second photodetector;

a beam splitter to transfer the first light beam incident from the first light source to the objective lens and to transfer the first light beam reflected from the first type optical disk and incident from the objective lens to the first photodetector, and to transfer the second light beam incident from the second light source to the objective lens and to transfer the second light beam reflected from the second type optical disk and incident from the objective lens to the second photodetector; and a collimator to collimate the first and second light beams incident from the beam splitter;

wherein the beam splitter, collimator, variable aperture, and objective lens are positioned in sequence.

20. The optical head as claimed in claim 13, wherein the variable aperture comprises:

a first region, centered about an optical center of the variable aperture, to totally transmit the first and second light beams incident thereto; and a plurality of adjacent regions, to totally transmit the first beam incident thereto, to transmit part of the second light beam incident thereto, and to diffract a remaining part of the second light beam incident thereto, each surrounding an adjacent one of the adjacent regions closer to the optical center and a first one of the plurality of adjacent regions surrounding the first region;

wherein each of the plurality of adjacent regions includes a diffraction grating pattern with slits disposed in concentric circles centered about the optical center.

21. The optical head as claimed in claim 20, wherein each of the plurality of adjacent regions has slits with a same depth in the same region, and the depth of the slits increases as a distance of the plurality of adjacent regions from the optical center increases.

22. The optical head as claimed in claim 21, wherein the plurality of adjacent regions includes second through fourth regions, wherein the slits of the second through fourth regions have depths of 1.27 µm, 2.54µ, and 3.81 µm, respectively.

23. The optical head as claimed in claim 21, wherein the first region has a first numerical aperture no greater than 0.36, the plurality of adjacent regions have numerical apertures greater than the predetermined value, and a transmissivity of the second light beam incident on the plurality of adjacent regions decreases as a distance from the optical center increases.

24. The optical head as claimed in claim 21, further comprising:

a first light source to emit the first light beam;

a first photodetector;

a second light source to emit the second light beam;

a second photodetector;

a beam splitter to transfer the first light beam incident from the first light source to the objective lens and to transfer the first light beam reflected from the first type optical disk and incident from the objective lens to the first photodetector, and to transfer the second light beam incident from the second light source to the objective lens and to transfer the second light beam reflected from the second type optical disk and incident from the objective lens to the second photodetector; and a collimator to collimate the first and second light beams incident from the beam splitter;

wherein the beam splitter, variable aperture, collimator, and objective lens are positioned in sequence.

25. The optical head as claimed in claim 24, wherein the variable aperture has a side attached to the beam splitter, wherein the side of the beam splitter has the plurality of adjacent regions including the slits.

26. The optical head as claimed in claim 13, wherein:

the first region has a first numerical aperture no greater than a predetermined value; and the second region has a second numerical aperture greater than the predetermined value.

27. A variable aperture which receives first and second light beams of different wavelengths, comprising:

a first region to transmit the first and second light beams incident thereto; and a second region, surrounding the first region and centered about an optical center, to totally transmit the first beam incident thereto, to transmit part of the second light beam incident thereto, and to diffract a remaining part of the second light beam incident thereto.

28. The variable aperture as claimed in claim 27, wherein the second region comprises a diffraction grating pattern with slits disposed in concentric circles centered about the optical center.

29. The variable aperture as claimed in claim 28, wherein the slits have a depth based upon:

$$d = m\lambda/(n-1);$$

wherein d is the depth of the slits, $\lambda$ is a wavelength of incident light, n is a refractive index of the diffraction grating, and m is an integer.

30. The variable aperture as claimed in claim 27, wherein the second region comprises:

a plurality of adjacent regions, to totally transmit the first beam incident thereto, to transmit part of the second light beam incident thereto, and to diffract a remaining part of the second light beam incident thereto, each surrounding an adjacent one of the adjacent regions closer to the optical center and a first one of the plurality of adjacent regions surrounding the first region;

wherein each of the plurality of adjacent regions includes a diffraction grating pattern with slits disposed in concentric circles centered about the optical center, and each of the plurality of adjacent regions has slits with a same depth in the same region, and the depth of the slits differs in each of the plurality of adjacent region.

31. The variable aperture as claimed in claim 30, wherein the depth of the slits increases as a distance of the plurality of adjacent regions from the optical center increases.

32. An optical head compatible with first and second types of optical disks, wherein distances from the optical head to respective information recording surfaces of the first and second types of optical disks differ from each other, and information is at least one of recorded and reproduced by first and second light beams having different wavelengths from each other, the optical head comprising:

a variable aperture to transmit the first and second light beams; and an objective lens to focus the transmitted first and second light beams from the variable aperture as beam spots on the respective information recording surfaces of the first and second types of optical disks, wherein the variable aperture transmits the first and second light beams so that the objective lens forms the beam spots on the respective information recording surfaces of the first and second types of optical disks with only respective main lobes.

33. An optical head which performs at least one of recording and reading of information on first and second types of optical recording disks having first and second optical recording surfaces, respectively, each said recording surface having a different distance from an objective lens of said recording head, the optical head comprising:

an objective lens to focus light onto each of said first and second optical recording surfaces, first and second light sources to emit light beams having first and second wavelengths, respectively;

an optical system to transmit said first and second light beams on first and second optical paths, respectively, to be incident on said objective lens; and a variable aperture having an optical center located on a common optical path of said first and second optical paths, said variable aperture having a first region centered about the optical center of said variable aperture which first region totally transmits the first and second light beams and a second region comprising a diffraction grating pattern with slits disposed in concentric circles centered about the optical center, said second region totally transmitting the first light beam, partially transmitting the second light beam, and diffracting a remaining part of the second light beam in said second region.

* * * * *

UNITED STATES PATENT AND TRADEMARK OFFICE
CERTIFICATE OF CORRECTION

PATENT NO. : 6,363,046 B1
DATED : March 26, 2002
INVENTOR(S) : Jang-Hoon Yoo et al.

It is certified that error appears in the above-identified patent and that said Letters Patent is hereby corrected as shown below:

Title page,
Item [56], References Cited, FOREIGN PATENT DOCUMENTS, insert the following omitted documents:
-- 09-073654   JP   3-18-97
   3036314    JP   9-24-97 --

Signed and Sealed this

Third Day of September, 2002

Attest:

Attesting Officer

JAMES E. ROGAN
Director of the United States Patent and Trademark Office